Patented Oct. 12, 1954

2,691,629

UNITED STATES PATENT OFFICE 2,691,629

SEALING MATERIAL FOR POROUS FORMATIONS

Robert A. Stoner, Columbus, Ohio, assignor to California Research Corporation, San Francisco, Calif., a corporation of Delaware No Drawing. Application March 13, 1951, Serial No. 215,385

7 Claims. (Cl. 252—8.5)

The present invention relates to methods and materials useful for sealing the walls of wells passing through porous formations and more particularly relates to improved materials useful in the drilling of oil and gas wells through porous formations.

In the drilling of oil and gas wells by conventional rotary methods, it is customary to circulate a drilling fluid down through a hollow drill pipe and up through the well bore. This drilling fluid generally contains finely-divided solid materials in liquid suspension which are capable of forming a mud-like sheath or filter cake on the walls of the well bore. While the fluid will form such a cake on the walls of the bore when the formations traversed by the well are of low porosity, fissures or crevices are frequently encountered in drilling which cannot be sealed off by the solid materials normally present in the drilling fluid. As a result, the fluid penetrates the formation and return of the circulated fluid is lost. Various additive materials have heretofore been suggested which may be introduced into the drilling fluid to assist the formation of a suitable mud cake on the wall of the well bore. Among these materials are sugar cane fibers, flax, straw, ground hemp, shredded paper, paper pulp, cellophane strips, ground plastics, mica flakes, expanded perlite, silica slag, ground fir bark, ground redwork bark and fibers, grape extraction residue, cottonseed hulls, cotton bolls, ginned cotton fibers and linters.

In general, the types of formation seals may be classified as either surface plugging, interstitial bridging or a combination of plugging and bridging. With surface plugging, the sealing material added to the drilling fluid normally coats the surface of the wall and then permits an impervious mud cake to be formed thereover. If the fissures or crevices causing the loss of fluid to the formation are quite narrow, surface-plug-forming materials are satisfactory to prevent such loss of fluid. However, surface plugs have been found to be easily disturbed or broken by the movement of drill pipe or other normal operations in the well which may involve contacting the well wall. On the other hand, in very coarse formations, seals of the interstitial bridging type are desirable and in this type of seal or plug the sealing material must actually enter the formation and bridge the fissures or crevices of the formation. While the latter type of seal is less susceptible to damage by well operations, it has been very difficult heretofore to find any single material which will effectively fill the spaces between the solid particles of the formation. Accordingly, to obtain a satisfactory seal of the bridging type, it has been common practice to employ a plurality of different types of sealing materials to obtain a satisfactory matrix upon which a mud cake may be deposited.

Heretofore, various materials such as those listed above have been proposed to prevent the loss of drilling fluid by forming either of the types of formation seals described. However, since it is impossible to diagnose the exact structure of the formation to which drilling fluid is being lost, there has long been desired a sealing material which will produce an effective seal irrespective of the type of formation encountered by the well bore. It is therefore an object of the present invention to provide a drilling fluid containing clay or other finely-divided, solid, mud-cake-forming materials having admixed therewith cotton seeds with the naturally-occurring fibers attached thereto which is capable of preventing the flow of such fluid into the crevices or fissures encountered in the drilling of a well bore.

It is another object of this invention to provide a sealing material comprising raw or unginned cotton seeds with the naturally-occurring fibers attached thereto as an additive material for drilling fluids containing finely-divided solid materials in liquid suspension which is adapted to cooperate more effectively with earth formation to prevent the loss of drilling fluid from a well bore to the formations.

Further objects and advantages of the present invention reside in certain novel features of the material used, as will be apparent from the following description.

It has been discovered that by the proper preparation and introduction of unginned or raw cotton into a drilling mud, a material has been provided which will effectively provide either a surface plug, an interstitial bridge or a combination of such seals dependent upon the formation which is to be sealed. In preparing the raw or unginned cotton for introduction into a drilling fluid, it is preferable to utilize field picked cotton removed from the boll and the cotton fibers partially separated without removal of the whole cotton from the seeds. It is preferable that the material be expanded or fluffed without crushing the cotton seeds entrained by the cotton fibers. Such material as described in this specification has been designated generally as unginned cotton.

It has been found that excellent results may be produced when unginned or raw cotton is mixed with drilling fluid in approximately the following proportions by weight:

|  | Per cent |
|---|---|
| Water | 75.7 |
| Wyoming bentonite | 5.2 |
| Barytes | 18.4 |
| Unginned cotton | 0.7 |

It will be apparent to those skilled in the art that the above proportions may be varied considerably, for example, by employing clays other than Wyoming bentonite and finely divided weighing materials other than barytes without sacrifice of the advantages obtained by employing the sealing material covered by this invention. Where this material is mixed with mud or cement slurry, it is desirable that the proportion of unginned cotton to mud be in the proportion of approximately 0.5 to 1.5% by weight, and accordingly this proportion may be said to constitute the preferred range of the invention.

While it will be noted that a very small proportion by weight of unginned cotton is used in the above example, it will be appreciated by those skilled in the art that the maintaining of this proportion as small as possible is advantageous in the normal functioning of the drilling fluid and in circulating cuttings up through the bore hole.

For the purpose of comparing the above described sealing material with other materials now in common use for the same purpose, test apparatus was assembled for determining the comparative loss of drilling fluid through a simulated earth formation having fissures or crevices similar to those that may be encountered in actual drilling practice. This apparatus comprised a cylindrical cell having an inside diameter of 7½ inches and a free space height of approximately 3 feet above a synthetic formation comprising a perforated plate in the bottom thereof adapted to support a bed approximately one foot in height of porcelain spheres or balls. Provision was made for introducing fluid at the top of the cell under pressure and the bottom of the cell below the perforated plate was provided with an opening so that the total amount of fluid flowing through the cell before a plug was formed could be collected and weighed. In performing the test, the cell was disposed in a vertical position and drilling fluid having the sealing material admixed therewith was introduced under pressure. The fluid flowing through the test cell was then collected and weighed until such time as an impervious cake was deposited in the cell. When such a cake was deposited and there was no further flow of fluid through the cell, the pressure was permitted to increase to 500 lbs. per square inch and this pressure was maintained for 15 minutes.

In these comparative tests, two different sizes of porcelain balls were employed. In the first case, one inch diameter balls or spheres were used and in the second case ½ inch diameter spheres were employed. In each case the mud fluid was mixed in the proportions recited above with the exception of the admix which was approximately 1.0% by weight when the one-inch diameter sphere formation was tested and 0.65% when the one-half inch diameter sphere formation was tested. The following tables show the amount of drilling fluid with various loss-preventing admixes added which passed through the test cell in pounds of fluid per square foot of simulated formation before an effective shut-off was achieved.

TABLE I

Loss through 1" sphere formation

| Admix | Lbs./Sq. Ft. of Formation |
|---|---|
| Cotton seed hulls | No seal formed, mud continued to flow. |
| Shredded redwood bark | Do. |
| Sugar cane fibers | Do. |
| Unginned cotton | 54. |

TABLE II

Loss through ½" sphere formation

| Admix | Lbs./Sq. Ft. of Formation |
|---|---|
| Cotton seed hulls | No seal formed, mud continued to flow. |
| Shredded redwood bark | 340. |
| Sugar cane fibers | 129. |
| Unginned cotton | 81. |

While the above comparative tests through a simulated formation do not indicate the actual loss of fluid that may be encountered in the drilling of an oil well, these tests indicate the comparative merits of various materials tested. In addition, inspection of the filter cake formed within the test cell indicated that the unginned cotton produced a very effective sealing action of the bridging type on extremely coarse formations. This appeared to be due to each whole cotton seed acting as a very rugged bridging particle which was capable of lodging in the interstices of the formation, and the fibers attached to the seed serving as a filamentary, interlocking mass. It will be readily appreciated that the relatively smooth configuration of the porcelain spheres provided a simulated formation that was more difficult to seal than would be encountered in an earth formation wherein the voids and fissures are of more irregular configuration, thereby permitting the cotton seed to act even more effectively as a binding nucleus for the attached cotton fibers to form a mat or layer upon which an impervious mud cake may be deposited.

It will also be understood that while many of the previously employed sealing materials may give satisfactory results in laboratory experiments, due to the more severe conditions encountered in actual drilling, such sealing material may be appreciably altered in field usage. For example, cotton bolls and other fibrous materials alone have been indicated as satisfactory by laboratory tests, but in field usage the material may be ground by repeated passage through pumps, valves, etc., into a fine fibrous pulp which is ineffective in the plugging of coarse formations. In this regard, unginned cotton appears to be particularly resistive to the abrasive action encountered when mixed with the mud stream, and then pumped down the drill pipe and outwardly through the bit. This is believed to be due primarily to the toughness and hardness of the whole cotton seed and the tenacity of the natural cotton fibers attached thereto.

In adding the raw or unginned cotton to the drilling fluid or to a cement slurry, it is desirable that the sealing material be thoroughly mixed with the fluid. However, this may be accomplished by the well understood and conventional method of mixing such remedial material by merely dumping the raw cotton into the settling pit and then mixing the mud with the usual mud stirring gun. If desired, the mixing of the raw cotton with the drilling fluid may be promoted by using wetting agents or synthetic detergents of the alkyl aryl sulphonate type.

In addition to the above-mentioned desirable characteristics of raw cotton in combatting lost circulation when added to a drilling fluid, there is little or no tendency for the cotton to ferment when added to a drilling fluid, and accordingly the admixing of this material will not ferment the mud when permitted to remain therein over a prolonged period of time.

While only two examples of the invention have been described above, it is obvious that raw cotton may be prepared in various ways and used in varying proportions without departing from the scope of the invention. It will be understood by those skilled in the art that unginned cotton may be effectively used to combat loss of circulation in drilling fluids other than those having a water base and accordingly is equally advantageous for the same purpose when combined with emulsion base or oil base fluids. In particular, the inclusion of impurities naturally present with field picked cotton such as bolls and twigs is not intended to be precluded by the description of the preferred manner of preparing the cotton.

I claim:

1. A composition of matter for use in drilling oil wells or the like comprising a drilling fluid containing finely-divided solid material in liquid suspension and cotton seeds with the natural cotton fibers attached thereto in a quantity of 0.5% by weight or more, said quantity being sufficient to retard the flow of fluid in crevices or fissures in earth formations.

2. A composition of matter for use in drilling oil wells or the like comprising a drilling fluid containing finely-divided solid material in liquid suspension and raw cotton seeds with substantially all of the natural cotton fibers attached thereto in a quantity of 0.5% by weight or more, said quantity being sufficient to retard the flow of fluid in crevices or fissures in earth formations.

3. A composition of matter for use in drilling oil wells or the like comprising a drilling fluid containing finely-divided solid material in liquid suspension and from about 0.5 to 1.5% by weight of cotton seeds with substantially all of the natural cotton fibers attached thereto.

4. A composition of matter for use in drilling oil wells or the like comprising a drilling fluid containing finely-divided solid material in liquid suspension and from about 0.5 to 1.5% by weight of raw cotton seeds with the natural cotton fibers attached thereto.

5. In a sealing composition for sealing crevices or fissures in a well hole wall, the combination of a drilling fluid including finely-divided solid material in a liquid suspension to act as a carrying vehicle and a sealing substance comprising raw or unginned cotton seeds with the natural cotton fibers attached thereto.

6. In the drilling of well holes, the method of preventing loss of drilling fluid containing clays or other finely divided, solid, mud-cake-forming materials into fissures or crevices in an earth formation traversed by said well which consists in incorporating in the drilling fluid unginned cotton seeds with the naturally occurring cotton fibers attached thereto, pumping the resulting composition into the well bore and to the crevices or fissures in the earth formation to lodge said seeds in said crevices or fissures of the formation to bridge the same, forming a filamentary interlocked mass against said formation and said seeds, with the cotton fibers attached to said seeds, and forming an impervious mud cake against said last-named mass.

7. A process for correcting lost circulation of drilling fluid during drilling of a well bore in the earth comprising admixing unginned or raw cotton seeds with the naturally-occurring cotton fibers attached thereto with a drilling fluid containing finely-divided solid material in liquid suspension and passing the resulting mixture into the bore to contact the lost circulation zone within said well bore.

References Cited in the file of this patent

UNITED STATES PATENTS

| Number | Name | Date |
|---|---|---|
| 2,502,191 | Williams | Mar. 28, 1950 |
| 2,599,745 | Campbell et al. | June 10, 1952 |

OTHER REFERENCES

A. P. I. "Circulation losses and their relation to composition of the structures," Article by Roy A. Silent, p. 72, "Oil and Gas Journal," May 21, 1936.